United States Patent [19]

Downey et al.

[11] 3,832,469
[45] Aug. 27, 1974

[54] ESTRUS AND OVULATION REGULATION

[75] Inventors: Bruce R. Downey, Morrisonville, N.Y.; Douglas S. Irvine, Terrebonne, Quebec, Canada

[73] Assignee: American Home Products Corporation, New York, N.Y.

[22] Filed: Apr. 16, 1973

[21] Appl. No.: 351,687

[52] U.S. Cl. ............................ 424/318, 424/305
[51] Int. Cl. ............................................ A61k 27/00
[58] Field of Search ............................ 424/305, 318

[56] References Cited
UNITED STATES PATENTS
3,707,548  12/1972  Bagli et al. .......................... 424/305

OTHER PUBLICATIONS
Chem. Abst. Gen. Subject Index – Vol. 76, (January–June 1972), p. 483GS.

*Primary Examiner*—Sam Rosen
*Attorney, Agent, or Firm*—Vito Victor Bellino; John W. Routh

[57] ABSTRACT

A method is disclosed whereby estrus is induced and ovulation is regulated in domestic animals by administering a prostaglandin derivative of formula 1a or 1b,

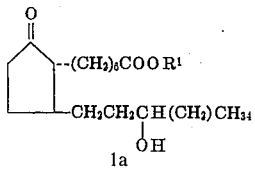
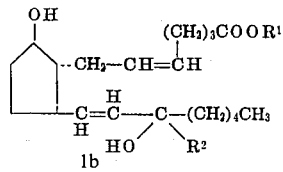

in which $R^1$ and $R^2$ each are hydrogen or lower alkyl, to the animal during the functional life of a corpus luteum of said animal.

6 Claims, No Drawings

ESTRUS AND OVULATION REGULATION

BACKGROUND OF THE INVENTION

1. Field of Invention

This invention relates to a method for regulating estrus and ovulation in domestic animals. More particularly, this invention relates to the synchronization of estrus at a predetermined time and the regulation of ovulation by administering an effective amount of certain prostaglandin derivatives to domestic animals of reproductive age.

2. Description of the Prior Art

Increasing herd size and management practices for breeding domestic animals have created the need to develop efficient methods for insemination at predetermined times. Indeed, it is often desirable to synchronize estrus in domestic animals, for example, horses, cattle, sheep, swine or dogs, in order to perform artificial insemination or mating with a male of the desired genetic quality under optimum conditions. In the past, this has been done by administering to the animal a progestin or other ovulation-inhibiting agent, withdrawing administration of said agent shortly before the date chosen for mating or artificial insemination, and relying either upon the natural production of LH and FSH to induce ovulation and to produce estrus or by administering gonadotrophins. However, this procedure was not entirely satisfactory because ovulation at a predetermined time occurred only in a certain proportion of the animals when gonadotrophins were not used. On the other hand, the high cost of gonadotrophins and side effects, for example, the occurrence of refractoriness, encountered in their administration made this method impractical.

Furthermore, the fertility of certain animals, for example, cattle, synchronized in this manner was lower than that obtained in untreated animals, W. Hansel and R. J. Schechter, Proceed. of the seventh Int. Congress on Reproduction and Artificial Insemination, Munich, Germany, Seventh 1972.

An improvement on this latter synchronization method, but more elaborate, involved the subcutaneous administration of small amounts of estrogen 20 hours after withdrawal of the progestogen whereby the deleterious effect on the conception rate was lessened.

A prerequisite to the onset of estrus is the regression of the corpus luteum. Recently, investigators have noted the rapid regression of this body following the administration of prostaglandin $F_{2\alpha}$ (PGF$_{2\alpha}$) in several species, see J. A. McCracken, Res. In Prost., Vol. 1, No. 4 (1972).

More recently, several investigators have reported the induction of estrus by the administration of PGF$_{2\alpha}$ to cows, for example, see L. E. A. Rowson et al., J. Reprod. Fert., 29, 145 (1972), and to horses, for example, R. H. Douglas and O. J. Ginther, Prostaglandins, 2, 265 (1972).

Notwithstanding the promise of the latter approach to a simple method for synchronizing estrus in animals the possible widespread use of this agent for this purpose would be severely hampered by the scarcity and high cost of PGF$_{2\alpha}$; the latter being available only by a technically complex extraction of natural sources or by elaborate syntheses, as well as certain side effects such as profuse sweating in horses after PGF$_{2\alpha}$ administration.

On the other hand, the present method for the synchronization of estrus and the regulation of ovulation is achieved by agents having a simple basic chemical structure, being more accessible by chemical synthesis, and having a comparatively better stability than the naturally occurring PGF$_{2\alpha}$. These characteristics of the present agents allow the facile preparation of suitable formulations for widespread application of the present method.

Further advantages of the present method involve a high margin of safety, the hastening of the onset of estrus and the maintenance of a normal fertility rate. Moreover, the method may be used in conjunction with the administration of an ovulator, for example, estrogens, gonadtrophins, releasing factors and the like, so that the regulation of ovulation is refined.

SUMMARY OF THE INVENTION

According to this invention an estrus inducing and ovulation regulating amount of a prostaglandin derivative of formulae 1a or 1b,

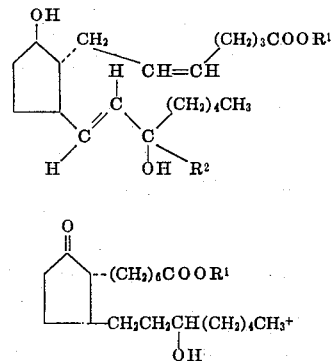

in which $R^1$ and $R^2$ each are hydrogen or lower alkyl, is administered to a female domestic animal during the functional life of a corpus luteum so that the onset of estrus is hastened and synchronized to occur at a predetermined time, and the induction of ovulation is regulated.

DETAILS OF THE INVENTION

The term "lower alkyl" as used herein contemplates straight chain alkyl groups containing from one to three carbon atoms and includes methyl, ethyl and propyl.

The compounds of formula 1a are described in U.S. Pat. No. 3,707,548, issued Dec. 26, 1972.

The compounds of formula 1b in which $R^2$ is hydrogen are described in Dutch Pat. No. 7,208,955, published Jan. 2, 1973.

The compounds of formula 1b in which $R^2$ is lower alkyl are described in the copending Patent Application of Abraham et al. Ser. No. 351,381, filed of even date herewith and entitled, "Alkyl Derivatives of Prostanoic Acids and Preparation Thereof."

It should be noted that like the natural prostaglandins the compounds of formulae 1a and 1b have two side chains which are in a trans relationship to each other. Also, like the natural prostaglandins, a double bond in the acid side chain of the compounds of this invention has the cis configuration and the double bond in the side chain bearing the hydroxy group has the trans configuration.

Notwithstanding the preceding considerations the compounds of this invention having one or more asymmetric carbon atoms can exist in the form of various stereochemical isomers, i.e., racemates and enantiomorphs. It is to be understood that such racemates and enantiomorphs are included within the scope of this invention.

Furthermore, it is to be understood that the pictorial representations used herein illustrating the compounds of this invention, are to be construed as including such racemates and enantiomorphs. For example, in formulae 1a and 1b the dotted line joining the acid side chain to the cyclopentane ring and the solid line joining the side chain bearing the hydroxy group are used for the purpose of illustrating the trans relationship of these two side chains and should not be construed as limiting the compounds to one enantiomorph but rather as including all possible enantiomorphs having this trans relationship. The prostaglandin derivatives of this invention in which $R^1$ is hydrogen, i.e., the acid derivatives of formulae 1a and 1b form salts with suitable pharmaceutically acceptable inorganic and organic bases. These derived salts possess the same activity as the parent acid and are included within the scope of this invention. The acid is transformed in excellent yield into the corresponding pharmaceutically acceptable salts by neutralization of said acid with the appropriate inorganic or organic base. The relative stability of the acid as compared to $PGF_{2\alpha}$ facilitates this transformation. The salts are administered in the same manner as the parent acid compounds. Suitable inorganic bases to form these salts include, for example, the hydroxides, carbonates, bicarbonates or alkoxides of the alkali metals or alkaline earth metals, for example, sodium, potassium, magnesium, calcium and the like. Suitable organic bases include the following amines: lower mono-, di- and trialkyl-amines, the alkyl radicals of which contain up to three carbon atoms, such as methylamine, dimethylamine, trimethylamine, ethylamine, di- and triethylamine, methylethylamine, and the like; mono-, di and trialkanol-amines, the alkanol radicals of which contain up to three carbon atoms, such as mono-, di- and triethanolamine; alkylene-diamines which contain up to six carbon atoms, such as hexamethylenediamine; cyclic saturated or unsaturated bases containing up to six carbon atoms, such as pyrrolidine, piperidine, morpholine, piperazine and their N-alkyl and N-hydroxyalkyl derivatives, such as N-methyl-morpholine and N-(2-hydroxyethyl)piperidine, as well as pyridine. Furthermore, there may be mentioned the corresponding quaternary salts, such as the tetraalkyl (for example tetramethyl), alkyl-alkanol (for example methyltrimethanol and trimethyl-monoethanol) and cyclic ammonium salts, for example, the N-methyl-pyridinium, N-methyl-N-(2-hydroxyethyl)-pyrrolidinium, N,N-dimethyl-morpholinium, N-methyl-N-(2-hydroxyethyl)-morpholinium, N,N-dimethyl-piperidinium and N-methyl-N-(2-hydroxyethyl)-piperidinium salts, which are characterized by an especially good water-solubility. In principle, however, there can be used all the ammonium salts which are physiologically compatible.

The transformations to the salts can be carried out by a variety of methods known in the art. For example, in the case of the inorganic salts, it is preferred to dissolve the selected acid in water containing at least an equivalent amount of a hydroxide, carbonate, or bicarbonate corresponding to the inorganic salt desired. Advantageously, the reaction is performed in a water-miscible, inert organic solvent, for example, methanol, ethanol, dioxane, and the like in the presence of water. For example, such use of sodium hydroxide, sodium carbonate or sodium bicarbonate gives a solution of the sodium salt. Evaporation of the solution or addition of a water-miscible solvent of a more moderate polarity, for example, a lower alkanol, for instance, butanol, or a lower alkanone, for instance, ethyl methyl ketone, gives the solid inorganic salt if that form is desired.

To produce an amine salt, the selected acid is dissolved in a suitable solvent of either moderate or lower polarity, for example, ethanol, acetone, ethyl acetate, diethyl ether and benzene. At least an equivalent amount of the amine corresponding to the desired cation is then added to that solution. If the resulting salt does not precipitate, it can usually be obtained in solid form by addition of a miscible diluent of low polarity, for example, benzene or diethyl ether or by evaporation. If the amine is relatively volatile, any excess can easily be removed by evaporation. It is preferred to use substantially equivalent amounts of the less volatile amines.

Salts wherein the cation is quaternary ammonium are produced by mixing the selected acid with an equivalent amount of the corresponding quaternary ammonium hydroxide in water solution, followed by evaporation of the water.

When the prostaglandin derivatives of formulae 1a and 1b are employed for the purpose of inducing estrus and regulating ovulation, they are administered systemically, preferably by intrauterine infusion or subcutaneous or intramuscular administration, in combination with a pharmaceutically acceptable liquid or solid carrier. Alternatively the derivatives can be administered by injection directly into the ovary. The proportion of the prostaglandin derivative is determined by its solubility in the given carrier, by the chosen route of administration, and by standard biological practice. For systemic administration to animals or administration by injection into the ovary, the compound of formulae 1a and 1b is used in sterile aqueous solution which may also contain other solutes such as buffers or preservatives, as well as sufficient pharmaceutically acceptable salts or glucose to make the solution isotonic. A convenient formulation for the water soluble salts of the acid derivitives of formulae 1a and 1b noted above, is in the form of a sterile aqueous solution.

The dosage will vary with the form of administration and with the particular species of animal to be treated and is preferably kept at a level of from 1 to 200 mcg/kg of body weight. However, a dosage level in the range of from about 10 to 100 mcg/kg of body weight is most desirably employed in order to achieve effective results.

The timing of the administration of the active agents of this invention is important. Generally speaking the agent is administered to the domestic animal during the life span of the corpus luteum of the animal. Corpus luteum formation and regression usually spans a major portion of the ovarian cycle of the domestic animals. However, its life span varies with the particular species and breed. In the horse (mare), for example, the ovarian cycle has a duration of about 18 to 24 days with the formation of the corpus luteum beginning about 2 days after ovulation and receding rapidly about 2 to 3 days before the onset of the next cycle. Consequently, for this species the administration of the active agents of this invention during the life span of the corpus luteum is done usually between two to three days following ovulation and 2 to 3 days prior to expected estrus, i.e., mostly between day six and day 18 of the cycle.

For the purpose of this disclosure day one of the cycle is that day in which the first signs of estrus are observed.

Similarly, the ovarian cycle of the cow has a duration of 18 to 24 days with the formation of the corpus luteum beginning about two days after ovulation (i.e., usually day four of the cycle). Therefore, in this case, the compounds of this invention are usually administered between days four and 20 during which time the corpus luteum is present.

Keeping in mind that the aforementioned variances will still occur, other domestic animals are treated similarly with consideration given to the presence of the corpus luteum for the particular species. The following table illustrates further the variations of the length of the cycle, time of ovulation and the life span of the corpus luteum between species.

| Species | Mean of Estrus * Cycle Length (days) | Time of * Ovulation (hr.) | Approx. Life Span of Corpora lutea |
|---|---|---|---|
| Cattle | 21.3 | 10.7 after end of estrus | day 4 – 20 |
| Goats | 19.4 | last day of estrus | day 4 – 18 |
| Sheep | 17.0 | 36 – 40 after beginning of estrus | day 4 – 18 |
| Swine | 20.7 | 36 after beginning of estrus | day 7 – 19 |
| Horse | 20.3 | 24 before end of estrus | day 6 – 18 |
| Dog | 235 | within 24 after beginning of estrus | for 60 days post estrus |

*"Reproduction in Domestic Animals," H. H. Cole and P. T. Cupps, Eds. 2nd ed., Academic Press, New York and London, 1969, p. 221. See also, "Veterinary Obstetrics and Genital Diseases," S. J. Roberts, Edwards Brother, Inc., Distributors, Ann Arbor, Mich., 1956.

Regression of the corpus luteum is a prerequisite to the onset of estrus. Recent inventigations have demonstrated that $PFG_{2\alpha}$ is luteolytic in horses, R. H. Douglas and O. J. Ginther, Prostaglandins, 2, 265 (1972) and cows, T. M. Louis et al., J. Anim. Sci., 35, 247 (1972) and thereby induces estrus and subsequent ovulation. Accordingly the utility of the compounds of this invention is demonstrable in standard pharmacologic tests designed to evaluate the luteolytic properties.

More specifically, the luteolytic properties of the compounds of this invention are demonstrable in the interruption of pregnancy test in hamsters as described by A. P. Labhsetwar, Nature, 230, 528 (1971). In this test the compound is given subcutaneously on a daily basis to mated hamsters on days four, five and six of pregnancy, thereafter the animals being sacrificed on day seven of pregnancy and the number of abortions counted.

Still more specifically, for example, when trans, cis-7-[2α-hydroxy-5-(3-hydroxy-1-octenyl)cyclopentyl]-5-heptenoic acid (1b; $R^1$ and $R^2 = H$) or trans, cis-7-[2α-hydroxy-5-(3-hydroxy-3-methyl-1-octenyl)cyclopentyl]-5-heptenoic acid (1b; $R^1 = H$ and $R^2 = CH_3$) were tested according to this method, it was found that complete abortions resulted at a dose of 2.5 and 0.5 mg/kg/day, respectively.

Further evidence of the luteolytic properties of the compounds of this invention is obtained when the compounds are evaluated in the interruption of pseudopregnancy test. In a typical application of this test pseudopregnancy is induced in adult female rats according to the method of W. H. Yang, Endocrinol., 82, 423 (1968). The test compound (vehicle only for controls) is injected daily, divided into two equal doses, s.c. from the first day of pseudopregnancy for eight consecutive days according to the method of B. B. Pharris and L. J. Wyngarden, Proc. Soc., Exp. Biol. Med., 130, 92 (1969). Vaginal smears are recorded daily until normal estrus cycles are resumed. When tested according to this method, trans, cis-7-[2α-hydroxy-5-(3-hydroxy-1-octenyl)cyclopentyl]-5-heptenoic acid (1b; $R^1$ and $R^2 = H$) sodium salt gave the results summarized in the following table.

INTERRUPTION OF PSEUDOPREGNANCY TEST IN RATS

| Daily Dose | No. of Rats | % Rats With Cornification | No. of Days with Cornification |
|---|---|---|---|
| Control (H₂O – 0.4 ml/day) | 20 | 15 | 12 |
|  |  | 60 | 13 |
|  |  | 90 | 14 |
|  |  | 100 | 15 |
| PGF₂α 4 mg/kg/day | 8 | 25 | 8 |
|  |  | 37.5 | 9 |
|  |  | 100 | 10 |
| trans, cis-7-[2α-hydroxy-5-(3-hydroxy-1-octenyl)-cyclopentyl]-5-heptenoic acid sodium salt 10 mg/kg/day | 8 | 50 | 7 |
|  |  | 75 | 8 |
|  |  | 100 | 9 |

Rats in the control group did not show cornification of the vaginal smears before day 12 of pseudopregnancy whereas all of the animals in each of the treated groups showed cornification before this date. In a position control, all animals treated with 4 mg/kg/day of PGF2α were no longer pseudopregnant by the tenth day.

On the ninth day of pseudopregnancy all eight of the rats given 10 mg of the above test compound of formula 1b were no longer pseudopregnant demonstrating the luteolytic properties of this compound.

The practise of this invention is exemplified by the following application involving a group of four normally cycling cows (1,000 to 1,200 lbs. in weight) having a detectable corpus luteum.

Trans, cis-7-[2α-Hydroxy-5-(3-hydroxy-3-methyl-1-octenyl)cyclopentyl]-5-heptenoic acid (1b; $R^1 = H$ and $R^2 = CH_3$) sodium salt (0.1 percent soln., w/v, in sterile water) was infused into the ipsilateral uterine horn of the cows between day four and day 20 of their normal estrus cycle, at a dose level of 10 or 20 mg/cow. On the third day following this treatment estrus was observed and on the following day ovulation occurred in three of the four cows. Ovulation was determined by rectal palpation. Normally the ocurrence of estrus and ovulation for this group would be expected to be completely at random.

In another exemplification of the present invention, 50 mg of trans-2-(3-hydroxyoctyl)-5-oxocyclopentaneheptanoic acid (1a, $R^1 = H$) sodium salt was administered by interuterine infusion in two equal doses on two consecutive days, i.e., 25 mg each day, to a group of 12 normally cycling mares, 2 to 3 days prior to the expected start of estrus. Estrus was determined by teasing with a stallion and the time of ovulation was determined by daily rectal palpation of the ovaries.

It should be noted that in this and the following exemplification, an enantiomorph of trans-2-(3-hydroxyoctyl)-5-oxocyclopentaneheptanoic acid having $[\alpha]_D^{25} = +17.4°$ (CHCl$_3$) is employed. This enantiomorph is contained in the corresponding mixture of stereochemical isomers described in U.S. Pat. No. 3,707,548, noted above or is obtained by the bioconversion of methyl trans-2-(3-oxooctyl)-5-oxocyclopentaneheptanote, described in the last cited U.S. Patent, with resting cells of Saccharomyces cerevisiae (ATCC — 4,125) and hydrolysis of the resulting methyl trans-2-(3-hydroxy-octyl)-5-oxocyclopentaneheptanoate with sodium hydroxide in aqueous methanol.

In this latter exemplification it was shown that in the medicated group estrus followed within 72 hours for 10 out of 12 horses after medication, with ovulation, as determined by rectal palpation, occurring in the majority (nine out of 12) of animals from the fourth to sixth day after the onset of estrus. In the control group ovulation was spread rather unevenly from the first day to the eighth day after the onset of estrus. Accordingly, ovulation was regulated, estrus occurred sooner and the duration of estrus was shortened in the medicated group as compared to the control group.

In still another exemplification, the onset of estrus was hastened and ovulation regulated in two mares treated with an interuterine infusion of trans-2-(3-hydroxyoctyl)-5-oxocyclopent-aneheptanoic acid sodium salt. The first mare was treated on day 19 of its cycle with 100 mg of the latter compound. The following day the mare was in estrus (day 20) and ovulated on day 24 (five days after medication). On the average the time between ovulation in successive cycles is 21 days; in this mare it was shortened to 16 days by the method of this invention.

The second mare was treated on day 15 and 16 with 100 mg of the said latter compound each day. Estrus occurred on day 17 followed by ovulation on day 20 (five days after the start of medication). Again the time between successive ovulation was shortened to 16 days by the treatment.

In yet another demonstration of the method of this invention a randomly selected group of 10 cycling heifers (700 – 900 lbs.), between the fourth and twentieth day of their cycle, were treated intrauterinely with 10 mg of trans, cis-7-[2$\alpha$-hydroxy-5-(3-hydroxy-1-octenyl)cyclopentyl]-5-heptenoic acid sodium salt. Estrus followed on the third and fourth day after this treatment in 80 percent of the heifers. The number of heifers in estrus at any given time in a corresponding group of untreated animals never exceeded 20 percent.

Finally, in a detailed demonstration of the efficacy of the method of this invention, 24 Holstein heifers, weighing between 700 and 900 lbs. and between the fourth and twentieth days of the normal estrus cycle were randomly assigned to one of the following three equal groups and treated as noted in the following table.

| Group | Treatment | Time of Insemination |
|---|---|---|
| A | trans, cis-7-[2$\alpha$-hydroxy-5-(3-hydroxy-3-methyl-1-octenyl)-cyclopentyl]-5-heptanoic acid sodium salt, 20 mg, intrauterine | 72 hrs. after treatment |
| B | trans, cis-7-[2$\alpha$-hydroxy-5-(3-hydroxy-3-methyl-1-octenyl)-cyclopentyl]-5-heptanoic acid sodium salt, 5 mg, intrauterine | 72 hrs. after treatment |
| C | Untreated Controls | At normal estrus |

All animals were housed together and maintained on similar ration for at least one month prior to commencement of the present experiment.

The time of onset and end of estrus was noted by observing external signs of estrus, for example, mounting of animals and vulvar discharge.

The time of ovulation was determined by rectal palpation of the ovaries.

Pregnancy was checked 60 – 65 days after breeding.

Accordingly this present experiment showed that for most animals in group A and B estrus resulted three days following the infusion of the compound of formula 1b (R$^1$ = H and R$^2$ = CH$_3$). Thereafter ovulation occurred in >70 percent of the animals on fourth day following the injection. On the other hand the number of animals in Group C in estrus at any given time never exceeded 20 percent throughout the course of this experiment. Furthermore, the fertility rate for all three groups was normal.

In the preceding exemplification of the practise of this invention, similar results are obtained when the sodium salt of the compounds of formula 1a or 1b, described therein, is replaced with another corresponding salt derived from a pharmaceutically acceptable inorganic or organic base noted hereinbefore.

As indicated previously the method of this invention can be used in conjunction with the administration of releasing factors. For example, after carrying out the method of this invention, the releasing hormone of lutenizing hormone (note Immer, et al., U.S. Pat. application Ser. No. 243,465, filed Apr. 12, 1972) can be administered (parenterally or by infusion) to a cow or mare 48 to 72 hours after treatment with the prostaglandin derivative of formula 1a or 1b so that the regulation of ovulation is refined (i.e., ovulation occurs within narrower limits of time). This latter procedure is particularly useful in the horse where the timing of ovulation is less predictable.

Further to improve the regulation of estrus and conception rate, an estrogen, for example, estradiol, estradiol benzoate or estradiol cyclopentylpropionate, can be given parenterally, either simultaneously with the compounds of formula 1a or 1b or within 48 hours thereafter.

We claim:

1. A method of inducing estrus and regulating ovulation in a domestic female animal which comprises administering to said animal during the functional life of a corpus luteum an effective amount of a prostaglandin derivative of formulae 1a or 1b,

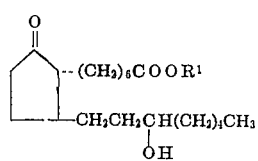
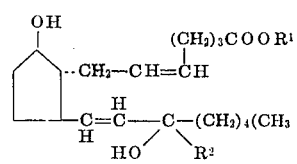

in which $R^1$ and $R^2$ each are hydrogen or lower alkyl.

2. A method as claimed in claim 1 in which the effective amount is from 1 to 200 mcg/kg of body weight.

3. A method as claimed in claim 1 in which the prostaglandin derivative of formula 1a is trans-2-(3-hydroxyoctyl)-5-oxocyclopentaneheptanoic acid.

4. A method as claimed in claim 1 in which the prostaglandin derivative of formula 1b is trans, cis-7-[2α-hydroxy-5-(3-hydroxy-1-octenyl)cyclopentyl]-5-heptenoic acid or trans, cis-7-[2α-hydroxy-5-(3-hydroxy-3-methyl-1-octenyl)cyclopentyl]-5-heptenoic acid.

5. A method as claimed in claim 1 in which the prostaglandin derivative of formula 1a or 1b in which $R^1$ is hydrogen is administered in the form of its salt derived from pharmaceutically acceptable inorganic or organic bases.

6. A method as claimed in claim 5 in which the salt is the sodium salt.

* * * * *

PO-1050
(5/69)

UNITED STATES PATENT OFFICE
CERTIFICATE OF CORRECTION

Patent No. 3,832,469          Dated    August 27, 1974

Inventor(s) Bruce R. Downey and Douglas S. Irvine

It is certified that error appears in the above-identified patent and that said Letters Patent are hereby corrected as shown below:

In the Abstract, formula 1a should read at the end of the hydroxyalkyl side chain --$\overline{(CH_2)}_4 CH_3$-- instead of "$(CH_2)CH_{34}$"

Col. 1, line 42, "Germany, Seventh 1972" should read --Germany, July 1972--

Col. 2, lines 25-35 the formula between lines 25 and 30 should be numbered as 1b and the formula between lines 30 and 35 should be numbered as 1a; delete "+" appearing at the end of the hydroxyalkyl side chain.

Col. 5, line 4, "ob-" should read --observed.--

Col. 6, the word bridging lines 34 and 35 "position" should read --positive--; line 36, "PGF2α" should read --$PGF_{2\alpha}$--

Signed and sealed this ?th day of April 1975.

(SEAL)
Attest:

RUTH C. MASON
Attesting Officer

C. MARSHALL DANN
Commissioner of Patents
and Trademarks